United States Patent [19]
Alpers

[11] 3,813,670
[45] May 28, 1974

[54] HIGH RESOLUTION RANGE TRACKING CIRCUIT

[75] Inventor: Frederick C. Alpers, Riverside, Calif.

[73] Assignee: The United States of America as represented by the Secretary of the Navy, Washington, D.C.

[22] Filed: Dec. 17, 1971

[21] Appl. No.: 210,263

[52] U.S. Cl. ............................ 343/7.3, 343/17.1 PF
[51] Int. Cl. ............................................. G01s 9/14
[58] Field of Search ............ 343/7.3, 5 DP, 17.1 PF

[56] References Cited
UNITED STATES PATENTS

| | | | |
|---|---|---|---|
| 3,344,421 | 9/1967 | Dildy, Jr. | 343/7.3 |
| 3,614,286 | 10/1971 | Trinite, Jr. | 343/7.3 |
| 3,618,085 | 11/1971 | Hall | 343/7.3 |
| 3,680,097 | 7/1972 | Huntsinger | 343/7.3 |

Primary Examiner—Maynard R. Wilbur
Assistant Examiner—G. E. Montone
Attorney, Agent, or Firm—R. S. Sciascia; G. J. Rubens; T. M. Phillips

[57] ABSTRACT

A circuit to provide an automatic range tracking function in very high resolution (short pulse radar or missile seeker). A tracking gate is generated by feeding the output of the oscillator for the transmitter trigger generator through a continuous phase shifter and binary counter to generate a gating pulse. An early-late tracking discriminator updates a velocity memory circuit that feeds a variable speed drive motor to drive the continuous phase shifter which completes a closed tracking loop. The tracking discriminator can be of an adaptive type that tracks a particular desired point on a compound target.

8 Claims, 8 Drawing Figures

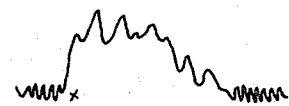
FIG. 2          FIG. 3
a 
a 
b 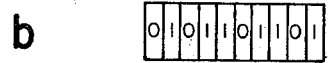
b 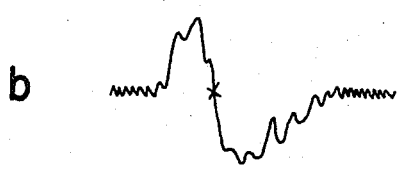
c 
d 
FIG. 4          FIG. 5

INVENTOR.
FREDERICK C. ALPERS 3,813,670

HIGH RESOLUTION RANGE TRACKING CIRCUIT

BACKGROUND OF THE INVENTION

In the past, range tracking circuits used with radars or missile seekers were generally of an analog type and provided only moderate range resolution (e.g., gate widths on the order of 0.5 μs, which is equivalent to 250 ft in range). For clutter suppression and other reasons, many recent radars have incorporated very short or compressed pulses, and the tracking of these pulses, particularly at long ranges, has taxed the capabilities of earlier circuits. For effective pulse widths on the order of 5 or 10 ns (0.005 to 0.010 μs), past analog tracking circuit designs have too much jitter and instability in the generation of suitable time delays. This has led to the use of tracking circuits in which the timing of the gate is established by digital delay generators rather than analog types. These digital circuits provide high stability and negligible jitter, but have the disadvantage that the delay changes corresponding to target range changes must be made in discrete steps rather than smoothly and continuously, as was the case with the analog circuits. At the cost of complexity, the individual steps can be made quite small (e.g., 5 ns or 2½ ft), which reduces the degree of disadvantage. However, in the case of complex targets, when the gated range increment changes abruptly there is frequently the possibility that a different point or area on the target will become the the new focus of the tracking action, and this switching from one point or area to another introduces angular scintillation in the overall tracking action (which presumably includes azimuth and elevation tracking as well as range). In the case of a missile seeker, this angular scintillation increases the circular error probability (CEP) of the missile guidance.

SUMMARY OF THE INVENTION

The present invention overcomes the disadvantages of prior known tracking circuits by using a stable oscillator and counter to generate trigger pulses for the radar or missile seeker transmitter. The same oscillator and a similar counter are used to generate a gating pulse. The oscillator output is continuously phase shifted so as to obtain a very slightly different pulse repetition frequency (PRF). Once the desired radar or seeker echo signal is acquired, in succeeding radar transmission cycles the timing of the gating signal is automatically compared with the time of reception to the desired echo signal and the signals are derived which indicate when the gate timing is slightly early or slightly late.

The early or late signals are used to adjust a target velocity memory, which in turn controls the rate of the phase shifter rotation and hence the exact PRF of the gate with respect to the transmitter trigger. The slight but accurately controlled difference in PRF's between the transmitter trigger and the gating pulse causes the gate to shift its position in the radar cycle as the range of the selected target changes. When compound targets (such as ships) are to be tracked, the tracking discriminator can be of an adaptive type that tracks a particular desired point on a compound signal.

OBJECTS OF THE INVENTION

An object of the present invention is the provision of an improved high resolution range tracking circuit that is substantially jitter-free.

Another object of the invention is the provision of an improved tracking circuit wherein the change in the relative timing of the tracking gate with respect to the trigger pulse is effected by use of a continuous phase shifter that is inserted ahead of one of the counters.

A further object of the invention is the provision of an improved range tracking circuit wherein tracking of a selected target within a compound target signal or a selected point within an extended target by the combined use of two channels, one of which produces range tracking corrections based on a selected element of the return signal if that element is reasonably isolated, and the other of which tracks the selected element by reference to other adjacent elements if the former is indistinct or inseparable.

Other objects and many of the attendant advantages of this invention will be readily appreciated as the same becomes better understood by reference to the following detailed description when considered in connection with the accompanying drawings wherein:

FIG. 2 is a waveform illustrating centroid tracking;

FIG. 3 is a waveform illustrating leading edge tracking;

FIG. 4 are waveforms illustrating split signal tracking;

FIG. 5 are waveforms illustrating compound tracking;

Figure 1:
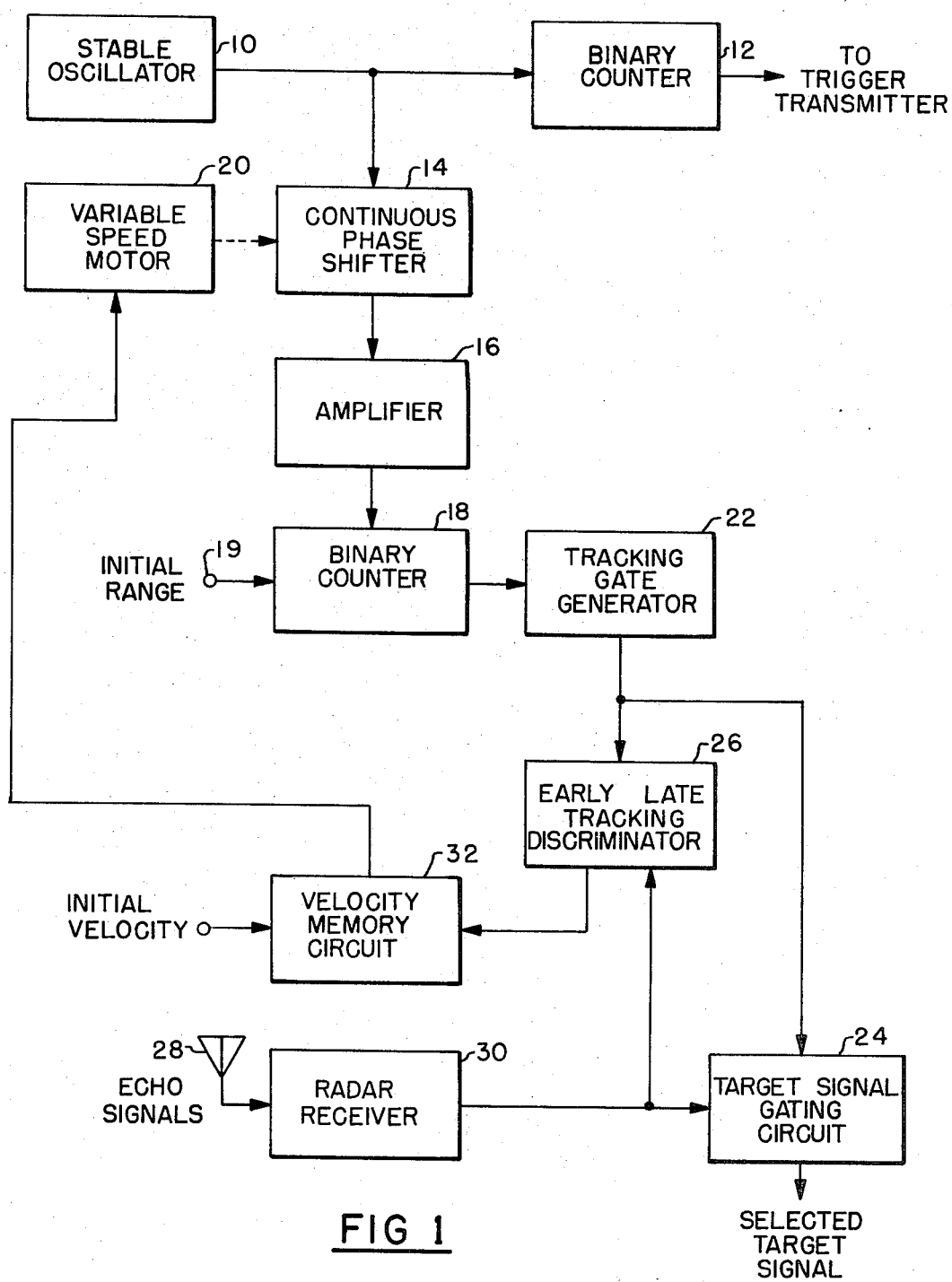
FIG. 1 is a block diagram of a range tracking circuit embodying the invention.

Referring now to the drawings, there is shown in FIG. 1 a block diagram of the elements comprising the basic tracking loop, the binary counter for generating the transmitter trigger and the receiver that receives the target echo signals to be tracked.

Circuit action begins with stable oscillator 10. This can be of any of the types of oscillator circuits that delivers a sine wave output. It typically could operate at an intermediate frequency (e.g., 20 MHz). The output of oscillator 10 is fed to binary counter 12 which supplies the trigger signal 13 to the radar or seeker transmitter, not shown. Binary counter 12 reduces the frequency by a large factor (e.g., by $2^{13}$, or 8192) and supplies a pulse in lieu of a sine wave output. Counter 12 should be of the recycling type and recycles itself after reaching the designated full count to establish the PRF of the radar or seeker (e.g., 2,440 pps).

The output of the stable oscillator 10 is fed through a continuous phase shifter 14 and amplifier 16 to a second binary counter 18 that is similar to counter 12. Phase shifter 14 should provide a phase shift that varies from 0° through 360° at the oscillator frequency. Phase shifter 14 is controlled by a variable speed motor 20 and may be of the Variogon V61 type. The Variogon V61 type provides phase shift that varies linearly with shaft rotation, and the shaft may be motor driven at speeds up to 5,000 rpm. Amplifier 16 restores the attenuation of the oscillator signal, and also provides a low impedance input to counter 18. In binary counter 18 the phase shifted oscillator signal is reduced in frequency by the same factor (e.g., $2^{13}$) that was introduced in binary counter 12. Instead of starting the count when power is first applied, counter 18 should be connected to start (or restart) its count when an initial range pulse is introduced at input terminal 19 by the radar operator or an automatic targeting circuit. This initial pulse should be timed to coincide with the arrival of the echo signal from the target that is to be tracked. Thereafter, binary counter 18 recycles itself and provides a periodic output pulse to trigger tracking gate generator 22.

The above described circuitry produces a tracking gate pulse which initially is delayed in time with respect to the transmitter trigger pulse, but which then decreases its relative delay linearly with phase shift as phase shifter 14 is rotated in the lead direction. Specifically, with each 360° of phase shift advance, the relative delay of the tracking gate pulse decreases by an amount equal to the transmitter interpulse period (1/PRF) divided by the full count of the binary counter (e.g., with a 20 MHz oscillator frequency and a $2^{13}$ counter, each 360° phase shift produces a 24.6 ft change in the two-way range equivalent of the tracking pulse delay). Similarly, continuously advancing the phase shift at a given rate gives rise to a gate range closure velocity (e.g., with the aforementioned design values, a 2,000 rpm shaft speed of motor 20 is equivalent to a closing velocity of 820 ft/sec). A very slightly different PRF is produced in the gating channel as compared to the transmitter triggering channel, with the result that the gate drifts through the transmitter triggering cycle at an extremely slow beat frequency (e.g., 0.0041 Hz) that is directly proportional to the rpm of the rotation of phase shifter 14.

When triggered by counter 18, tracking gate generator 22 produces a low-impedance gating pulse that is applied to both target signal gating circuit 24 and an early/late tracking discriminator 26. Target signal gating circuit 24 controls the actual time-based selection of the target signal that is passed to later radar or seeker circuitry and used for deriving target direction and range data. Of the possibly numerous echo and clutter signals that are received through antenna 28 and amplified and detected by receiver 30, only the one that coincides with the tracking gate will be passed for further processing. Tracking gate generator 22 may consist of any of several types of circuit that produce a very short (e.g., 10 nsec) pulse and target signal gating circuit 24 may be any of several well-known gated amplifier or multi-diode gating circuits.

The early/late tracking discriminator 26, a velocity memory circuit 32, and variable speed motor 20 provide a feedback loop to control phase shifter 14 and thereby maintain tracking gates generated by gate generator 22 in coincidence with the selected target signal once tracking has been initiated. Discriminator 26 may be any one of several known circuits that provide a given polarity of output current if the gating pulse arrives slightly later than the received signal being tracked, an opposite polarity of output if the gate is early. Such a circuit is described in U.S. Pat. No. 3,093,821. Velocity memory circuit 32 may consist of a capacitor to ground, across which a voltage indicative of the range closure velocity is developed, plus suitable input and output isolation circuits to keep the voltage from leaking off. Variable speed motor 20 may be of any small dc type and can generally be connected to the easily rotated shaft of a Variogon type phase shifter without requiring reduction gears. If a purely electronic phase shifter is used in lieu of the Variogon, variable speed motor 20 may be replaced with a low frequency oscillator whose frequency is controllable.

The action of the overall feedback loop is to increase the velocity memory voltage and speed up the rotation of the phase shifter 14 if discriminator 26 senses a lagging of the tracking gate behind the target signal, and to reduce the memory voltage and slow down the rotation of phase shifter 14 if the gate tends to lead. Thus, the relative gate velocity is adjusted to equal the rate of target range closure and the gate is kept essentially in synchronism with the time of arrival of the echo from the desired target. To facilitate acquisition, a voltage indicative of the estimated target-to-radar velocity (or, for a seeker, the missile-to-target velocity) is initially set into the velocity memory circuit 32.

The above described feedback loop will provide high resolution range tracking of the electrical centroid, or center of energy along the time axis, of a simple target signal such as that shown by $x$ in the waveform of FIG. 2. However, when a radar or seeker having a very short effective pulse width (and hence very small range increments) is used against a relatively large target such as a ship, the target extends over a number of range increments and produces either an extended target signal, such as that shown in FIG. 3 or FIG. 4a, or a compound target signal that is broken into smaller target elements, such as that shown in FIG. 5a. If it is acceptable to track the front or leading edge of such an extended target, a leading edge circuit such as one of those described in U.S. Pat. No. 3,121,869 can be incorporated into early/late tracking discriminator 26. This will result in a point of tracking as illustrated at $x$ in FIG. 3; that is, the timing of the tracking gate will be maintained at the point, $x$, where only a small leading portion of the extended signal is actually tracked and utilized for homing, fire control, or similar purposes. If it is preferred to track a point further back in an extended target, a split signal type of early/late tracking discriminator can be used. The resultant tracking point, $x$, illustrated in FIG. 4b, can be adjusted to an earlier or later position within the target signal.

Figure 6:
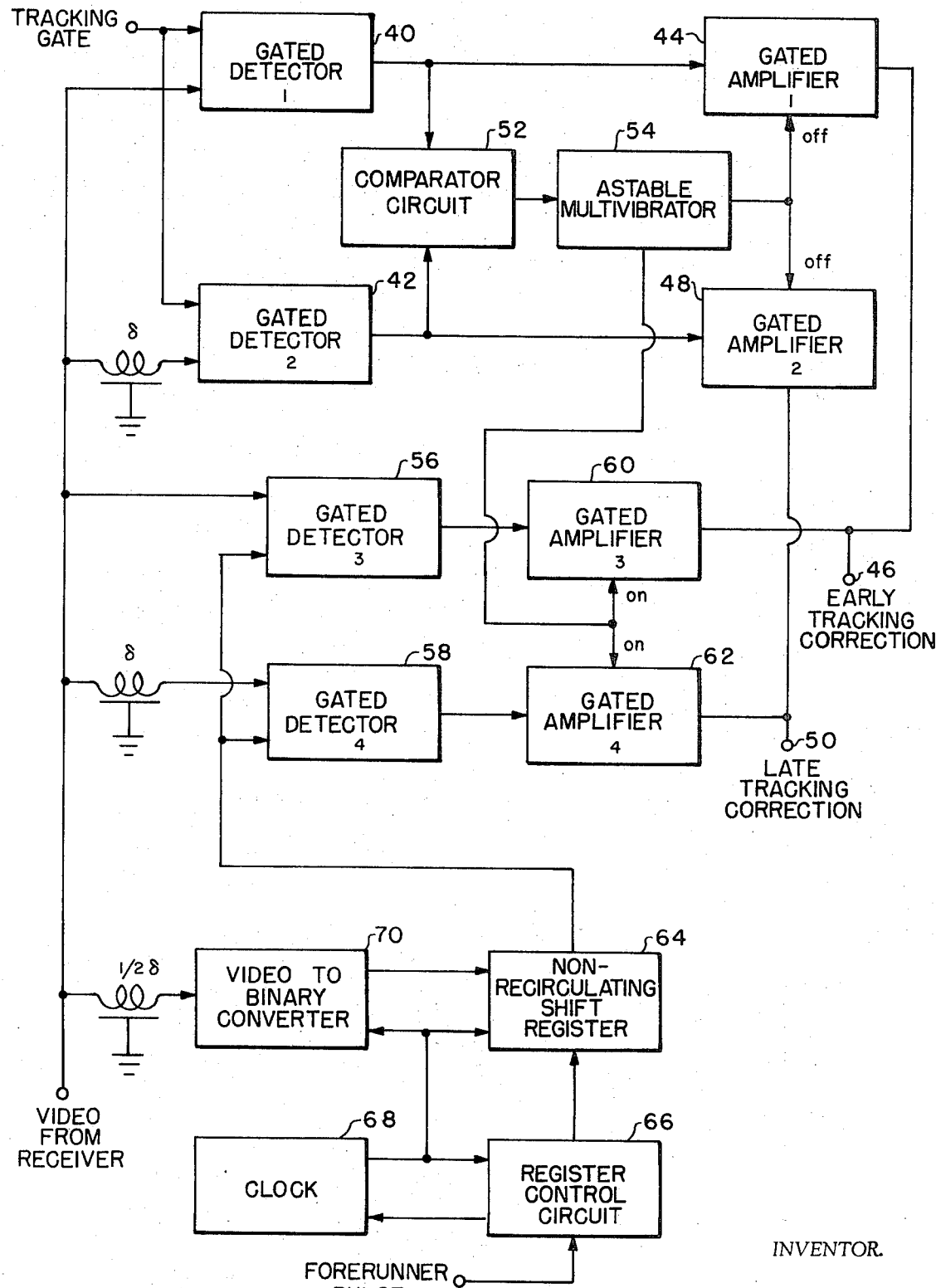
FIG. 6 is a block diagram of a compound target tracking discriminator.

For tracking a particular point near the center of a compound target, particularly if the portion of the signal being tracked is scintillating severly, the tracking discriminator shown in FIG. 6 may be used in place of discriminator 26. In FIG. 6 there are essentially two discriminator channels that are interlinked; one analog channel that generates the required early/late tracking correction signals when the portion of the signal to be tracked is relatively separate and discernible, and a partially digital channel that utilizes information derived from adjoining range increments to generate the correction signals when the analog channel is unproductive. To implement the circuit the tracking gate generator must also supply a tracking gate forerunner pulse that leads the actual tracking gate by a small, fixed increment of time (typically less than 1 $\mu$sec).

Referring to FIG. 6, the particular increment of the video signal from the receiver that arrives in coincidence with the tracking gate is detected in gated detector 40, while the preceding increment of signal, after being delayed by approximately one effective (compressed) radar pulse width ($\delta$), is simultaneously detected in gated detector 42. The detector actions produce signals that are stretched in time and decay exponentially. If the portion of the video signal being tracked is separate and distinct from other portions and it arrives at detector 40 input in coincidence with the tracking gate, detector 40 will have an output, while detector 42 will not. The output from detector 40 is amplified by gated amplifier 44 and will then appear as a tracking correction output at terminal 46 that indicates that the gate is arriving slightly earlier than it should. Similarly, coincidence of the gate with the video signal after the latter has been delayed will cause an output from detector 42 and result in a late tracking correction from gated amplifier 48 at terminal 50. If the gate is timed to arrive half in coincidence with the undelayed video signal and half with the delayed signal, which is the desired gate timing, there will be partial and equal outputs from both detectors. Such outputs will result in opposing tracking corrections that cancel each other when they are applied to velocity memory circuit 32 (FIG. 1). However, if the gate coincides with a section of strong video signal that extends to both sides of the gate position, a full rather than partial output will arise from both detectors. This condition of full and equal outputs will cause an output signal from comparator circuit 52 that may consist of threshold detectors and a gated diode network. The threshold detectors would be biased so that only reasonably full signals appearing at the comparator input are able to reach the gated diode network. If both signals are present, the one gates the other through the network and an output signal results. If only one input or neither input is at full strength, there is no output. In digital terms, comparator 52 is the equivalent of an AND circuit. The signal from the comparator 52 triggers astable ("one shot") multivibrator 54 which provides a gate that exceeds the duration of the detectors 40 and 42 output signals. The output of one side of the multivibrator 54 is then used to gate off both amplifiers 44 and 48, thereby cutting off any tracking correction signals from this channel.

Whenever corrections from the analog channel are cut off, the output of the opposite side of multivibrator 54 serves to gate on corresponding gated amplifiers 60 and 62 in the other channel, thereby enabling the other channel to take control of the tracking loop feedback action. This switching from one channel to the other provides tracking when the signal to be tracked is not separate and distinct but rather is encompassed with other segments of signal, and thus will not result in useful tracking correction signals from the detector 40 and 42 outputs as the tracking gate changes position by small increments.

Gated detectors 56 and 58 and gated amplifiers 60 and 62 function in a manner similar to their counterparts in the analog channel previously described with the exception that amplifiers 60 and 62 are gated on rather than off by multivibrator 54. However, the gate applied to detectors 56 and 58 comes from shift register 64 and is a compound gate such as that shown in FIG. 5c. The tracking loop feedback action that is initiated in gated detectors 56 and 58 is therefore one of (1) producing an early tracking correction if most of the elements of the compound gate are in coincidence with corresponding elements in the undelayed video signal (FIG. 5a), (2) producing a late tracking correction if the coincidence of most gate elements with corresponding video signal elements comes about when the video is delayed by approximately one radar pulse width ($\delta$); and (3) producing equal and opposite corrections (which cancel each other upon reaching the velocity memory circuit) if the gate is timed as desired, i.e., halfway between the undelayed and the delayed video.

The compound gate (FIG. 5c) supplied by shift register 64 will in general comprise an irregular arrangement of 1 or 0-value pulses, each of width $\delta$ and the total number $n$ of such elements will generally be a number slightly larger than the ratio of the anticipated range extent of a typical target to the length of one range increment as set by the pulse width, $\delta$. The exact form taken by this gate depends upon the particular arrangement of reflecting elements on the target as evidenced by the shape of compound video signal (FIG. 5a). Specifically, as indicated in FIG. 5b, the gate will be a binary digitalized representation of the earlier video signal. For a shift register with the minimum allowable number of memory elements, the video signal which determines the exact form of the gate will be that from the preceding radar cycle. For more sophisticated shift registers, the form-determining signal may be taken from a number of cycles back (in order to increase the length of memory) or may be an average taken over a number of recent cycles. Thus the compound gate will not only be adapted to the general reflecting contour of the particular target being tracked, but also will adapt to changes in the aspect from which the target is viewed.

Timing of the compound gate is controlled by means of shift register control circuit 66. When register control circuit 66 is triggered by the forerunner pulse from tracking gate generator 22 (FIG. 1), it in turn triggers an electronic clock 68 which generates very short pulses at intervals equal to the effective radar pulse width, $\delta$. A video-to-binary converter 70 receives these clock pulses, and at the instant of each pulse supplies a "1" input to shift register 64 if the $\frac{1}{2}/2\delta$-delayed video signal is then above a set threshold level, or a "0" input if below. The $\frac{1}{2}/2\epsilon$ delay assures that the video signal used to form succeeding gates is centered between the undelayed video signal applied to gated detector 56 and the $\delta$-delayed video signal applied to gate detector 58. The clock pulses are also supplied to shift register 64 for triggering the shift of stored binary data from memory element to memory element as new data enters. The output of shift register 64 is fed to detectors 56 and 58 where it serves as the compound gate. When the count reaches the total number of gate elements, $n$, control circuit 66 generates an output that is fed to clock 68 for stopping the clock action, which in turn stops converter 70 and shift register 64 actions, and the stored binary video signal data is left in the register until the next radar cycle.

The timing of the tracking gate used in the analog channel of FIG. 6 will typically be at or near the center of the compound gate used in the other channel. If desired, an operator may control the timing (through adjustment of the delay between the forerunner and tracking gate pulses) in order to facilitate locking to a particular element of the compound target signal while tracking by the other channel keeps the entire signal steady and jitter free for display and observation purposes. A circuit may be added to adjust the relative timing in the event that the element of signal originally within the tracking gate is lost because of a tracking failure, a change in the aspect from which the target is viewed, etc. A digital NOR circuit using the same inputs as comparator circuit 52 in FIG. 6 could sense that a target was not being gated by either analog channel detector, and a continued signal from the NOR circuit over a number of cycles could be made to cause the forerunner-to-tracking gate delay to be varied in an oscillating manner with increasing amplitude until tracking of an adjacent portion of the target was established.

Figure 7:
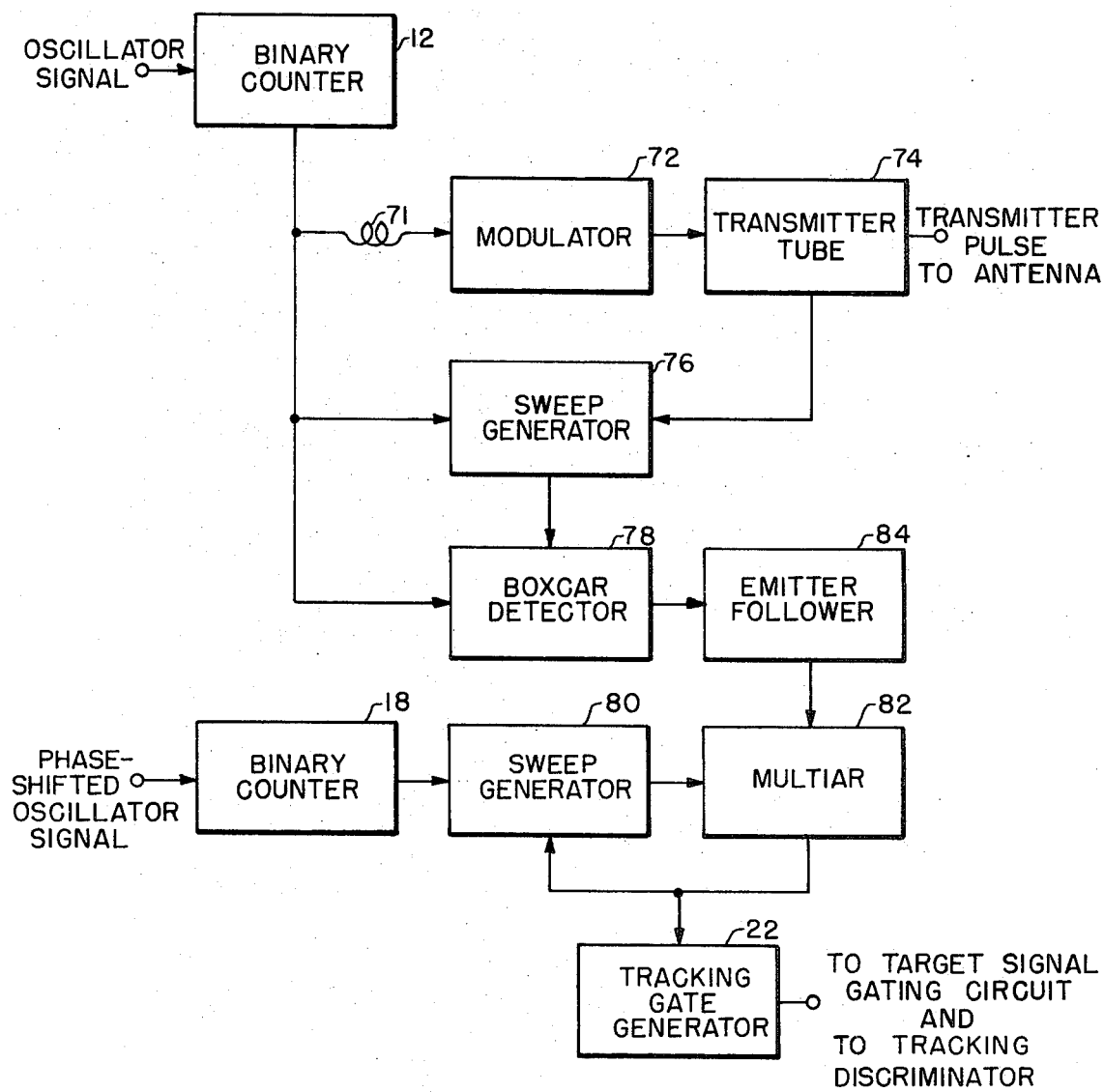
FIG. 7 is a block diagram of the jitter compensation circuit.

To accommodate inherent transmitter jitter, the circuit of FIG. 1 may be modified as shown in FIG. 7. In the jitter compensation circuit of FIG. 7, the trigger pulse from counter 12 is supplied through delay 71 to modulator 72 of the transmitter. The trigger pulse is also used to trigger fast sweep circuit 76 and to clear boxcar detector 78 of any prior signal. The delay of delay line 71 should be sufficient to allow boxcar detector 78 to be completely cleared and the sawtooth waveform from sweep generator 76 to start before there is any chance of transmitter tube 74 firing. When transmitter tube 74 is fired a turn off signal is fed back to stop the sweep of sweep generator 76. Boxcar detector 78 registers the peak voltage attained during the sweep, which voltage is then proportional to the actual interval (intentional delay plus jitter) between the trigger pulse and the firing of transmitter 74. This voltage is retained by boxcar circuit 78 until cleared at the start of the succeeding cycle.

The pulse from binary counter 18 in the tracking gate channel triggers a second fast sweep generator 80 that should produce a sweep identical to the sweep of sweep generator 76. The sweep voltage of sweep generator 80 is fed to a multiar 82 which uses the output of boxcar detector 78 as its reference voltage. The output of boxcar detector 78 is coupled through an emitter follower 84 to provide a low impedance to multiar 80. When the sweep voltage of sweep generator 80 rises to the point where it equals the reference voltage, multiar 82 fires and triggers tracking gate generator 22. The output of multiar 82 is also fed to sweep generator 80 to provide a turn-off signal and permit recovery for the following cycle. Since the sweeps are the same and multiar 82 operates when the voltage are equal, the delay interval introduced in the tracking circuit is equal to that actually present in the firing of transmitter tube 74, and the jitter is compensated on a cycle by cycle basis.

Figure 8:
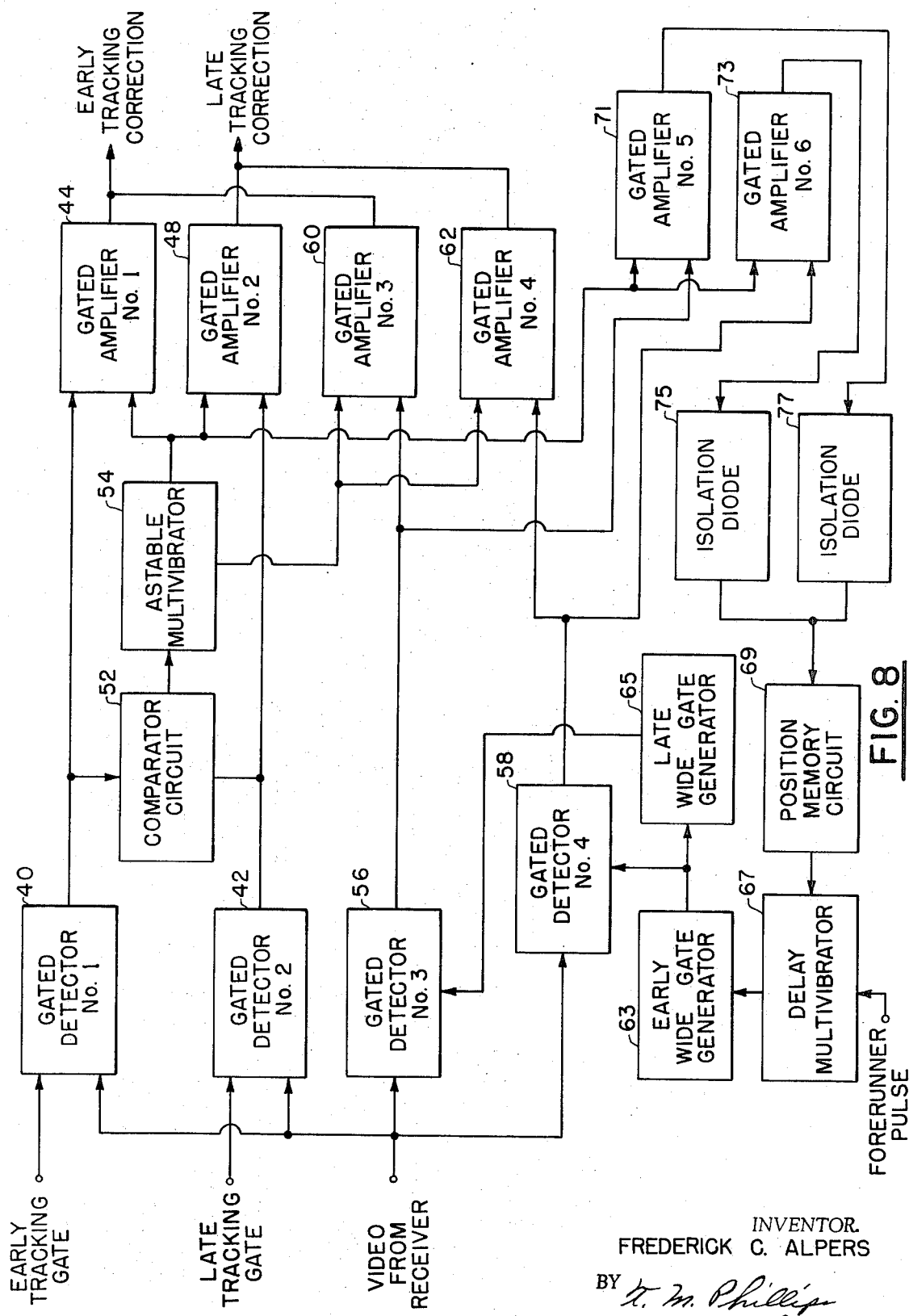
FIG. 8 is a block diagram of a modification of the circuit of FIG. 6.

FIG. 6 may be further modified to provide an adaptive analog tracking discriminator as shown in FIG. 8. Like the digital/analog circuit just described, the adaptive analog circuit also provides a means for tracking a particular desired point on a compound target, but functions by memorizing the position of this point within the overall target signal rather than by memorizing other details of the target signal contour in addition to the point of interest.

In FIG. 8, the actions of gated detectors 40 and 42, comparator circuit 52, astable multivibrator 54, and gated amplifiers 44 and 48 are similar to those of their counterparts in FIG. 6. Exceptions are that gated detectors 40 and 42 should operate with early and late tracking gates that straddle the range gate, and comparator circuit 52 should provide an output when both detectors 40 and 42 show gate coincidence with a strong video signal and also when neither of detectors 40 or 42 shows such coincidence. In digital terms, the comparator 52 is a combination of an AND circuit and a NOR circuit in parallel. The action of this portion of the FIG. 8 circuitry is for providing tracking corrections to the velocity memory circuit of the range tracker when the output of gated detectors 40 and 42 are present but are not both saturated. When both are saturated or when neither is present, tracking corrections from this portion of the circuit are cut off, and, as will be described below, corrections generated by gating coincidences in other gated detectors are substituted.

Detectors 56 and 58 are gated in sequence by the outputs of early and late wide gate generators 63 and 65, for which the rise of late gate 65 is triggered by the trailing edge of early gate 63. Generators 63 and 65 supply gates that are wide in comparision to the gates used in detectors 40 and 42 (i.e., ~100 nsec vs 5 nsec). The objective is to provide gates that will be spread in range sufficiently to accept signals from all portions of the target-or at least from major portions in the case of a large target-without being spread to the point of encompassing other targets or becoming clutter saturated. Unlike the narrower tracking gates, these wide gates are not intended to straddle the particular point on the target that is to be tracked. Instead, they are triggered a short time ($\sim 1/\mu sec$) after the forerunner pulse supplied by the tracking gate generator 22 with the exact time of triggering controlled by delay multivibrator 67. The delay introduced by multivibrator 67 is in turn controlled by gate position memory circuit 69 that is part of the adaptive feedback loop including gated amplifiers 71 and 73 and isolation diodes 75 and 77.

During normal tracking of the selected point on the target (i.e., when the signals reaching comparator circuit 52 are neither both saturated nor both zero, and range tracker velocity corrections are supplied by gated amplifiers 44 and 48), the action of the above adaptive feedback tracking loop is to alter the delay of delay multivibrator 67 until the average amplitude of signals from near portions of the target that are gated in detector 58 equals the average amplitude of signals from far portions that are gated in detector 56. The timing of the wide gates then is adjusted to center on the overall electrical centroid of the target return. This action of centering the wide gates is independent of the action in tracking the selected point on the target that takes place simultaneously in the upper portion of the circuit and that is completed via the velocity control loop of FIG. 1.

If the signal from the selected point on the target either fades out temporarily or blends in with that of adjacent portions to form a solid block of saturated signal, comparator circuit 52 senses this and astable multivibrator 54 is triggered. The output signal from the multivibrator 54 then gates off amplifiers 44, 48, 71, and 73 so that the feedback actions in the adaptive tracking loop and in the loop associated with detectors 40 and 42 are both interrupted. In the case of the adaptive loop, this means that memory circuit 69 is isolated and its output, as well as the delay of delay multivibrator 67, remains at the previously adjusted value. At the same time, gated amplifiers 60 and 62, which are normally off, are gated on. This gating change results in the outputs of detectors 56 and 58 being supplied to the velocity tracking loop of FIG. 1. Since these two outputs have already been balanced through action of the adaptive loop, however, this substitution of signals to the main range tracker will not result in any immediate change in gate position or gate velocity. Rather, tracking corrections will only develop if the adaptively established wide gate position begins to lead or lag the average overall target return. Thus the substitute tracking action tends to keep the gate supplied to target signal gating circuit 24 in coincidence with the desired point on the target by keeping the center point of the wide gates coincident with the centroid of the target signal while the separation between the range gate and the center point of the wide gates, as established by the adaptive tracking circuit, remains fixed. When the signal associated with the desired point on the target again appears (which will normally occur after a fading period of no more than a second or two), the near coincidence of the range gate with this signal will lead to the re-establishment of tracking action by the circuits shown in the upper portion of FIG. 8, and also updating of the adaptive tracking loop delay if necessary.

Obviously many modifications and variations of the present invention are possible in the light of the above teachings. It is therefore to be understood that within the scope of the appended claims the invention may be practiced otherwise than as specifically described.

What is claimed is:

1. In a high resolution range tracking circuit, the combination comprising:
   a. a stable oscillator for generating a sine wave output of a predetermined frequency;
   b. a first binary counter coupled to the output of said stable oscillator for producing a transmitter trigger pulse in response to a predetermined count of said stable oscillator output signal;
   c. a continuous phase shifter having an input coupled to the output of said stable oscillator and having an output;
   d. a second binary counter having an input coupled to the output of said continuous phase shifter and having an output;
   e. a tracking gate generator having an input coupled to the output of said second binary counter for generating a gating signal in response to a predetermined count of said stable oscillator output signal;
   f. radar receiver means for receiving echo signals from a target of interest;
   g. a gating circuit coupled to said radar receiver and to said tracking gate generator for allowing target signals from said radar receiver to pass when a gate signal is present from said target gate generator;
   h. feedback circuit means in circuit with said tracking gate generator, said radar receiver and said continuous phase shifter for maintaining the tracking gate generated by said tracking gate generator in coincidence with a selected target signal.

2. The range tracking circuit of claim 1 wherein said feedback circuit means includes a discriminator circuit having a first input coupled to said tracking gate generator, a second input coupled to said radar receiver and providing an output voltage proportional to the relative time of arrival of said tracking gate signals and said target signals.

3. The range tracking circuit of claim 2 wherein said feedback circuit means further includes a memory circuit coupled to and providing a continuous output voltage proportional to the rate of change of range of said tracking discriminator;
   a variable speed motor coupled to said continuous phase shifter and to the output of said velocity memory circuit for changing the speed of said continuous phase shifter in response to the output of said tracking discriminator.

4. The range tracking circuit of claim 2 wherein said discriminator circuit includes:
   a. a first detector channel that provides tracking correction signals when the signal to be tracked is separate and discernible and provides an enabling pulse when the signal to be tracked is not separate and discernible;
   b. a second detector channel coupled to said first detector channel and being responsive to said enabling pulse to continue to provide tracking correction signals until the signal to be tracked is discernible.

5. The range tracking circuit of claim 2 wherein said discriminator comprises:
   a. a first gated detector having a first input coupled to the output of said tracking gate generator, a second input coupled to the output of said radar receiver and having an output;
   b. a second gated detector having a first input coupled to the output of said tracking gate generator, a second input coupled through a delay circuit to said radar receiver and having an output;
   c. a first gated amplifier having a first input coupled to the output of said first gated detector, a second input and an output;
   d. a second gated amplifier having a first input coupled to the output of said second gated detector, a second input and an output;
   e. a comparator circuit having a first input coupled to the output of said first gated detector, a second input coupled to the output of said second gated detector and output;
   f. an astable multivibrator having an input coupled to the output of said comparator circuit and having a first output coupled to the second inputs of said first and second gated amplifiers and having a second output;
   g. a third gated detector having a first input coupled to the output of said radar receiver a second input and an output;
   h. a fourth gated detector having a first input coupled through a delay circuit to the output of said radar receiver, a second input and an output;
   i. a third gated amplifier having a first input coupled to the output of said third gated detector, a second input coupled to the second output of said astable multivibrator and an output;
   j. a fourth gated amplifier having a first input coupled to the output of said fourth gated detector, a second input coupled to the second output of said astable multivibrator, and an output;
   k. a video to binary converter coupled to said radar receiver and to the second inputs of said third and fourth gated detectors to provide tracking information while said first and second gated amplifiers are gated off and said third and fourth gated amplifiers are gated on.

6. The range tracking circuit of claim 1 wherein a jitter compensation circuit means is coupled to said first and second binary counters and to said tracking gate generator to provide jitter compensation on a cycle by cycle basis in response to the transmitted pulse.

7. The tracking circuit of claim 6 where said jitter compensation circuit means includes:

a. a transmitter tube modulated by a delayed signal from said first binary counter;
b. a first sweep generator being turned on by the output of said first binary counter and being turned off by the firing of said transmitter tube;
c. boxcar detector means coupled to said first sweep generator for producing an output signal whose peak amplitude is proportional to the intentional delay plus the delay caused by jitter;
d. a second sweep generator coupled to the output of said second binary counter for producing a sweep identical to the sweep of said first sweep generator;
e. a multiar circuit coupled to said boxcar detector means and said second sweep generator for generating an output trigger pulse when the rise of the sweep voltage from said second sweep generator equals the output signal from said boxcar detector means.

8. The range tracking circuit of claim 2 wherein said discriminator comprises:
a. a plurality of gated detectors;
b. a plurality of gated amplifiers;
c. each of said gated detectors having an input coupled to said radar receiver;
d. analog circuit means including a position memory circuit coupled between said gated detectors and said gated amplifiers for tracking a memorized point within the overall target signal.

* * * * *